United States Patent

[11] 3,568,014

| [72] | Inventor | Fritz L. Schuermeyer<br>325 W. Center College St., Yellow Springs, Ohio 45387 |
|---|---|---|
| [21] | Appl. No. | 831,447 |
| [22] | Filed | June 9, 1969 |
| [45] | Patented | Mar. 2, 1971 |

[54] GRADED INSULATOR THIN FILM CAPACITOR AND METHOD OF MAKING
2 Claims, 2 Drawing Figs.

[52] U.S. Cl. .................................................. 317/258, 29/25.42
[51] Int. Cl. .................................................. H01g 3/075
[50] Field of Search .......................................... 29/25.42; 317/258; 204/38.1

[56] References Cited
UNITED STATES PATENTS
1,621,058  3/1927  Burger ....................... 317/258

| 3,113,253 | 12/1963 | Ishikawa ...................... | 317/258 |
| 3,234,442 | 2/1966 | Maissel ......................... | 317/258 |
| 3,239,731 | 3/1966 | Matovich ...................... | 317/258 |
| 3,256,588 | 6/1966 | Sikina ........................... | 317/258(UX) |
| 3,365,626 | 1/1968 | Mohler .......................... | 317/258X |

Primary Examiner—E. A. Goldberg
Attorneys—Harry A. Herbert, Jr. and James S. Shannon ABSTRACT: A thin film capacitor suitable for microelectronic circuit applications using aluminum as one electrode and any suitable metal, such as gold, as the other electrode. The dielectric is a metallic oxide of high dielectric constant, such as $Ta_2O_5$, contacted directly by the gold electrode but having a thin film of $Al_2O_3$ interposed between it and the aluminum electrode. The relatively high barrier of the $Al$-$Al_2O_3$ interface prevents the injection of electrons from the metal into the dielectric and greatly reduces the dissipation and rectifying tendency of the capacitor.

PATENTED MAR 2 1971 3,568,014

INVENTOR.
F.L. SCHUERMEYER
BY Harry A. Herbert Jr
ATTORNEY
James S. Shannon
AGENT

GRADED INSULATOR THIN FILM CAPACITOR AND METHOD OF MAKING

BACKGROUND OF THE INVENTION

The invention relates to thin film capacitors, particularly those employing as the dielectric metallic oxides of high dielectric constant. Tantalum capacitors employing $Ta_2O_5$ as the dielectric, such as described for instance in U.S. Pat. No. 3,376,481 to J. Klerer, are examples. Such capacitors are usually formed by first depositing on a suitable substrate a layer of tantalum. The tantalum layer is then subjected to an oxidizing process, such as anodization, for converting the tantalum to a desired depth to $Ta_2O_5$ which serves as the dielectric, thus forming the dielectric and one electrode of the capacitor. The other electrode is then formed by depositing a suitable metal such as gold on the surface of the $Ta_2O_5$ dielectric.

While capacitors of the above type provide a high capacitance for their size, they have the disadvantage of being rectifying and lossy, especially at low frequencies.

SUMMARY OF THE INVENTION

Investigation has shown the above adverse effects in tantalum thin film capacitors to be due to the low barrier height, approximately 0.3ev., at the $Ta$-$Ta_2O_5$ interface, which results in a relatively high probability of electron injection from the metal into the oxide. In accordance with the invention these effects are avoided while retaining the advantage of the high dielectric constant of $Ta_2O_5$ by using an aluminum electrode in place of the tantalum electrode and by interposing a thin layer of $Al_2O_3$ between the aluminum electrode and the $Ta_2O_5$ dielectric. Since the barrier at the $Al$-$Al_2O_3$ interface is relatively high, approximately 1.8ev., the probability that electrons will enter the conduction band of the oxide dielectric is very small and the resulting dissipation and rectification are greatly reduced in comparison with capacitors having a $Ta$-$Ta_2O_5$ interface. Although the dielectric constant of $Al_2O_3$ is low relative to $Ta_2O_5$, the major portion of the dielectric is made up of the latter so that the capacitance is only slightly reduced.

Thin film capacitors of this type may be constructed by depositing a layer of aluminum on a suitable substrate, oxidizing the aluminum layer to a depth sufficient to produce a thin layer of $Al_2O_3$, depositing a layer of tantalum on the $Al_2O_3$, completely oxidizing the tantalum to $Ta_2O_5$, and depositing a top electrode on the $Ta_2O_5$ of a suitable metal such as gold.

DETAILED DESCRIPTION OF THE INVENTION

Figure 1:
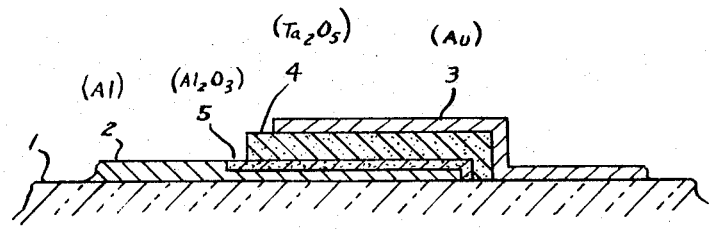
FIG. 1 is a cross section, not to scale, showing the construction of a thin film capacitor in accordance with the invention.

Referring to FIG. 1, the thin film capacitor shown is supported by a suitable insulating substrate 1. The electrode 2 of the capacitor is made of aluminum and the electrode 3 of gold or other suitable metal. The dielectric between the electrodes is principally composed of a layer 4 of $Ta_2O_5$ with a thin layer 5 of $Al_2O_3$ interposed between the $Ta_2O_5$ and the aluminum electrode. Because of the high dielectric constant of $Ta_2O_5$, the $Al_2O_3$ should constitute as small a portion of the total dielectric as possible. The electrode 3 should be made of a metal providing a relatively high energy barrier at its interface with the $Ta_2O_5$. In the case of Au, this energy barrier is 1.5ev.

As stated earlier, and as shown for example in the above-referenced patent to Klerer, the usual method of constructing a tantalum thin film capacitor is to anodize a tantalum electrode to produce the $Ta_2O_5$ dielectric on which the other electrode is then deposited. Such capacitors tend to be lossy and to rectify due to the injection of electrons from the tantalum electrode into the $Ta_2O_5$ dielectric across the relatively low energy barrier (0.3ev.) at the $Ta$-$Ta_2O_5$ interface. The capacitor of FIG. 1 avoids a $Ta$-$Ta_2O_5$ junction by using aluminum instead of tantalum as the electrode metal and $Al_2O_3$ as the dielectric at the junction between the metal electrode and the dielectric. The relatively high barrier energy (1.8ev.) at the $Al$-$Al_2O_3$ interface greatly reduces the probability that electrons will be injected from the metal electrode into the dielectric, thereby greatly improving the quality of the capacitor from the standpoints of dissipation and rectification. Although $Al_2O_3$ has a lower dielectric constant than $Ta_2O_5$, it constitutes only a minor portion of the dielectric and therefore does not reduce the capacitance appreciably below the value it would have were the dielectric entirely $Ta_2O_5$.

Figure 2:
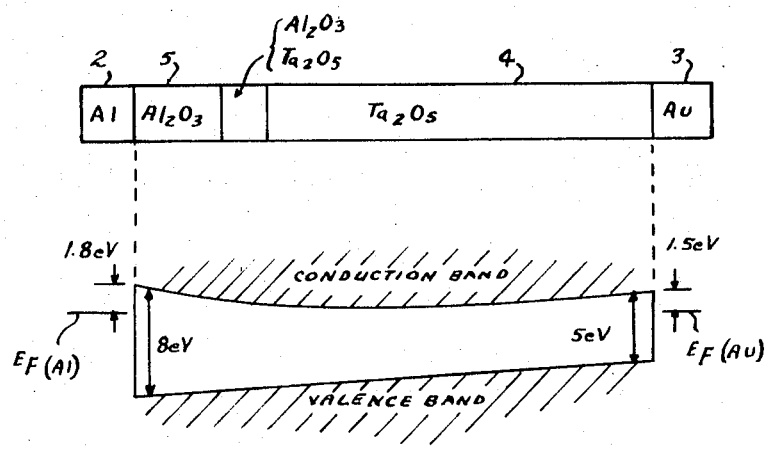
FIG. 2 is an energy band diagram of the capacitor shown in FIG. 1.

FIG. 2 illustrates the energy band diagram of the capacitor of FIG. 1 at zero voltage, the diagram being shown opposite a cross section of the capacitor. The forbidden gap in the dielectric ranges from 8ev. for $Al_2O_3$ to 5ev. for $Ta_2O_5$. The levels $E_{F(Al)}$ and $E_{F(Au)}$ are the Fermi levels of the aluminum and gold electrodes respectively.

The following is a specific example of a method by which a capacitor of the type shown in FIG. 1 may be constructed:

1. Deposit a layer of Al approximately 500—1000 A thick on a suitable substrate. This may be accomplished by any of the known methods such as vapor deposition or sputtering.
2. Anodize the Al in a suitable solution, such as tartaric acid, to a voltage of 5—20 volts as required to produce the oxide $Al_2O_3$ to the desired depth.
3. Deposit a thin layer of tantalum (Ta) with the desired geometry on top of the formed $Al_2O_3$ by any known method. The thickness is critical and will be determined by the considerations given in step (4).
4. Anodize completely the Ta layer in a suitable solution, such as 0.1 percent $H_2SO_4$, under constant current conditions with a current of, for example, $3 \times 10^{-4}$ A/cm$^2$. During anodization, the voltage across the layer will rise. When all the Ta has been transformed into $Ta_2O_5$, the voltage will rise sharply or jump. Since it is undesirable to anodize the $Al$-$Al_2O_3$ interface further, the anodization must be stopped at the beginning of the voltage jump. The Ta layer thickness must be chosen such that its complete anodization results in the desired $Ta_2O_5$ thickness. As an example, 250A of Ta will result in a 1000A film of $Ta_2O_5$ and the anodization potential will be 50 volts.
5. Deposit a top electrode of a suitable metal, such as Au, of the desired thickness and geometrical form by any of the various known methods.

While the specific capacitor described above uses $Ta_2O_5$ as the dielectric material, the invention may also be applied to capacitors using other metallic oxides of high dielectric constant such as $TiO_2$, $HfO_2$, $Nb_2O_5$ and $Bi_4Ti_3O_{12}$. Also a $Si$-$SiO_2$ interface, having a barrier height of 3.0ev., may be substituted for the $Al$-$Al_2O_3$ interface. Further, the oxides need not be formed by anodization as described, but may be deposited directly as by sputtering.

I claim:

1. The method of forming a thin film $Ta_2O_5$ capacitor comprising the steps of: depositing a thin layer of aluminum on a suitable insulating substrate to form a first electrode; oxidizing the surface of said aluminum layer to a small depth to form a thin layer of $Al_2O_3$; depositing a layer of Ta on said $Al_2O_3$ layer; completely oxidizing said Ta to $Ta_2O_5$ to form the principal dielectric of the capacitor; and depositing a second metallic electrode on said $Ta_2O_5$ layer, the metal of said second electrode being one having at its interface with the $Ta_2O_5$ a much higher energy barrier against the injection of electrons from the metal into the conduction band of the $Ta_2O_5$ than the relatively low barrier that exists at an interface between Ta and $Ta_2O_5$.

2. A thin film capacitor comprising, on an insulating substrate, a first electrode consisting of a thin layer of aluminum having a portion of its surface oxidized to $Al_2O_3$ to a small depth, a layer of $Ta_2O_5$ on said oxidized surface constituting the principal dielectric of the capacitor, and a second electrode on said $Ta_2O_5$ layer, said second electrode being a thin layer of a metal having at its interface with the $Ta_2O_5$ dielectric a much higher energy barrier against the injection of electrons from the metal into the conduction band of the $Ta_2O_5$ than the relatively low barrier that exists at an interface between Ta and $Ta_2O_5$.